US012540719B1

(12) United States Patent
Lan et al.

(10) Patent No.: US 12,540,719 B1
(45) Date of Patent: Feb. 3, 2026

(54) LAMP WITH ADJUSTABLE LIGHT EMITTING ANGLE

(71) Applicant: Xiamen Guangpu Electronics, Ltd., Xiamen (CN)

(72) Inventors: Guohua Lan, Xiamen (CN); Zhifu Xie, Xiamen (CN); Yuxi Chen, Xiamen (CN); Haiding Su, Xiamen (CN); Guobiao Lin, Xiamen (CN)

(73) Assignee: Xiamen Guangpu Electronics, Ltd., Xiamen (CN)

( * ) Notice: Subject to any disclaimer, the term of this patent is extended or adjusted under 35 U.S.C. 154(b) by 0 days.

(21) Appl. No.: 19/046,607

(22) Filed: Feb. 6, 2025

(30) Foreign Application Priority Data

Nov. 6, 2024 (CN) ......................... 202422700677.8

(51) Int. Cl.
*F21V 14/06* (2006.01)
*F21V 31/00* (2006.01)

(52) U.S. Cl.
CPC ............ *F21V 14/06* (2013.01); *F21V 31/005* (2013.01)

(58) Field of Classification Search
CPC ...... F21V 14/06; F21V 14/065; F21V 31/005; F21V 17/02; F21V 17/04
See application file for complete search history.

(56) References Cited

U.S. PATENT DOCUMENTS

| | | | | |
|---|---|---|---|---|
| 10,451,252 | B1 * | 10/2019 | Sayers | F21V 17/101 |
| 11,774,069 | B1 * | 10/2023 | Jiang | F21V 21/15 362/319 |
| 2021/0222850 | A1 * | 7/2021 | Harada | F21S 41/295 |

OTHER PUBLICATIONS

Innovation Q+ NPL Search (Year: 2025).*

* cited by examiner

*Primary Examiner* — Anabel Ton
(74) *Attorney, Agent, or Firm* — Cooper Legal Group, LLC

(57) ABSTRACT

A lamp with an adjustable light emitting angle includes a supporting plate, a lens plate, and a lamp board. An upper side of the supporting plate is disposed with a guiding member, the guiding member has a guiding slope with a varying height, and the supporting plate includes a position-providing openings penetrating through the supporting plate along a vertical direction. The lens plate includes an upper extension plate, and the upper extension plate includes an abutting shaft. The lens plate is disposed below the supporting plate, the upper extension plate passes through the position-providing opening, and the abutting shaft is disposed on the guiding slope. The lamp board is disposed below the supporting plate and is located between the supporting plate and the lens plate. A light emitting angle of the lamp is configured to be adjusted by changing a distance between the lamp board and the lens plate.

10 Claims, 10 Drawing Sheets

LAMP WITH ADJUSTABLE LIGHT EMITTING ANGLE

RELATED APPLICATIONS

This application claims priority to Chinese patent application number 202422700677.8, filed on Nov. 6, 2024. Chinese patent application number 202422700677.8 is incorporated herein by reference.

FIELD OF THE DISCLOSURE

The present disclosure relates to the technical field of lighting fixtures and in particular to a lamp with an adjustable light emitting angle.

BACKGROUND OF THE DISCLOSURE

Lighting fixtures are indispensable tools in daily life. As people's aesthetic standards improve, along with the diversity of indoor environments and various usage scenarios, there is increasing demand for different light-emitting angles in lighting fixtures. Existing lighting fixtures typically rely on lampshades to control the light-emitting angle of the light source. However, the structure of lampshades is often bulky, making them unsuitable for thin lighting fixtures. Additionally, changing the light-emitting angle often requires replacing the lampshade, which is inconvenient.

BRIEF SUMMARY OF THE DISCLOSURE

The technical problem to be solved by the present disclosure is to provide a lamp with an adjustable light emitting angle.

In order to solve the above technical problems, the present disclosure provides the lamp with the adjustable light emitting angle.

The lamp comprises a supporting plate, a lens plate, and a lamp board. An upper side of the supporting plate is disposed with one or more guiding members, and each of the one or more guiding members has a guiding slope with a varying height. The supporting plate comprises one or more position-providing openings penetrating through the supporting plate along a vertical direction, and each of the one or more position-providing openings corresponds to a position of the guiding slope of a corresponding one of the one or more guiding members.

The lens plate comprises one or more upper extension plates extending upwardly, and each of the one or more upper extension plates comprises an abutting shaft extending laterally. The lens plate is disposed below the supporting plate, and the one or more upper extension plates pass through the one or more position-providing openings. The abutting shaft is disposed on the guiding slope, and a height position of the abutting shaft on the guiding slope is configured to be adjusted by changing a relative position of the lens plate and the supporting plate, so that a distance between the lens plate and the supporting plate is configured to be adjusted.

The lamp board is installed below the supporting plate and is located between the supporting plate and the lens plate, and a light emitting angle of the lamp is configured to be adjusted by changing a distance between the lamp board and the lens plate.

Furthermore, the supporting plate has a central axis, and the one or more guiding members are a plurality of guiding members. The plurality of guiding members are divided into a plurality of groups of guiding members, and each of the plurality of groups of guiding members is arranged in a first rotational array around the central axis. Each of the plurality of guiding members has an arc-shaped structure, with the central axis serving as a center of an arc of the arc-shaped structure, and the one or more position-providing openings extends in an arc-shaped path along the guiding slope and are formed by penetrating through a middle of the guiding slope. The one or more upper extension plates on the lens plate are a plurality of upper extension plates, and the plurality of upper extension plates are divided into a plurality of groups of upper extension plates. Each of the plurality of groups of upper extension plates is arranged in a second rotational array around the central axis, and the plurality of upper extension plates correspond to the plurality of guiding members in a one-to-one correspondence. Two sides of each of the plurality of upper extension plates extends laterally to form the abutting shaft, and two sides of the abutting shaft are respectively disposed on the guiding slope. The lens plate is configured to be rotated around the central axis.

Furthermore, the supporting plate and the lens plate have circular structures, and the plurality of guiding members and the plurality of upper extension plates are respectively combined to form an inner ring group and an outer ring group. The inner ring group is arranged adjacent to the central axis, and the outer ring group is arranged at an outer edge of the supporting plate.

Furthermore, the abutting shaft is formed by a pin shaft penetrating through and installed on a corresponding one of the plurality of upper extension plates.

Furthermore, the supporting plate is disposed with a cover, and the cover is disposed above the one or more guiding members. The cover has one or more upper guiding surfaces, and the one or more upper guiding surfaces are configured to limit a position of a top of the one or more upper extension plates. Each of the one or more upper guiding surfaces has a height-varying shape that is matched with the guiding slope of the corresponding one of the one or more guiding members, so that a distance from each position of the guiding slope to a corresponding one of the one or more upper guiding surfaces is equal.

Furthermore, the guiding slope comprises a plurality of lateral flat portions and a plurality of inclined portions, and the plurality of lateral flat portions are arranged in a height-descending arrangement. Each of the plurality of inclined portions is arranged between two adjacent lateral flat portions of the plurality of lateral flat portions.

Furthermore, parts of the corresponding one of the one or more upper guiding surfaces which are located above the plurality of lateral flat portions form a plurality of elastic-sheet structures, and each of the plurality of elastic-sheet structures comprises a positioning protrusion protruding downward. The top of the one or more upper extension plates comprises a positioning groove recessed downward. When the one or more upper extension plates are in a position corresponding to one of the plurality of lateral flat portions, the positioning protrusion is embedded in the positioning groove to form an interlocked connection for the one or more upper extension plates. When the plurality of elastic-sheet structures are subjected to an external force, the plurality of elastic-sheet structures are configured to be deformed to enable the positioning protrusion to be detached from or be placed in the positioning groove.

Furthermore, the supporting plate comprises a first mark, and the lens plate comprises a second mark. The first mark and the second mark are adjacent to each other, and a position correspondence state of the first mark and the second mark is configured to indicate a position state of the lens plate.

Furthermore, an inner side and an outer side of the lens plate each comprises an annular vertical edge, and an inner position and an outer position of a bottom of the supporting plate each comprises an annular sealing member. The annular sealing members on the supporting plate are respectively adapted to the annular vertical edges on the lens plate to form an inner waterproof structure and an outer waterproof structure. The lamp board has an annular structure, and the lamp board is located between the inner waterproof structure and the outer waterproof structure.

Furthermore, the annular sealing member comprises a silicone ring and a fixing ring, and the fixing ring enables the silicone ring to be secured on the supporting plate. The silicone ring has a plurality of protruding rings extending toward the annular vertical edges, and the plurality of protruding rings and the annular vertical edges are mutually pressed. The plurality of protruding rings are arranged at intervals in the vertical direction.

Based on the above description, it is evident that compared with the existing techniques, the technical solution has the following advantages. The lamp with the adjustable light emitting angle provided by the present disclosure achieves changes in the light emitting angle by adjusting the distance between the lens plate and the lamp board. Only a slight adjustment in height is needed to achieve the desired light emitting angle, making it adaptable for use in flat lighting fixtures. The adjustment mechanism of the present application adopts a structure in which the abutting shaft moves along the guiding slope. The guiding slope is designed with the plurality of lateral flat portions corresponding to different light emitting angles. The design of the positioning groove and the positioning protrusion on the plurality of elastic-sheet structures ensures a damping sensation and precise positioning when the lens plate rotates into a set position, allowing for accurate light emitting angle adjustments. The design of the inner ring group and the outer ring group provides a reliable supporting structure and a dependable rotation and positioning structure between the supporting plate and the lens disk. The lamp board is located between the inner waterproof structure and the outer waterproof structure, protecting the lamp board from external splashes and enabling the lamp to achieve IP65 waterproofing standards.

Figure 1:
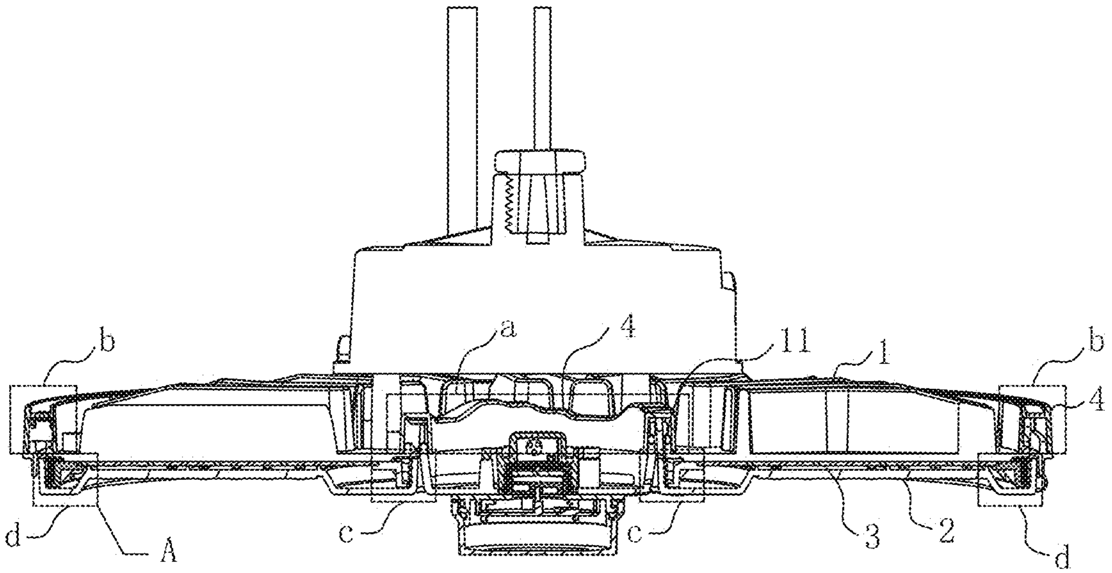
FIG. 1 is a cross-sectional view of a lamp with an adjustable light emitting angle of the present disclosure.

Reference numerals: 1. supporting plate; 11. guiding member; 12. guiding slope; 121. lateral flat portion; 122. inclined portion; 13. position-providing opening; 14. first mark; 15. annular sealing member; 151. silicone ring; 1511. protruding ring; 152. fixing ring; 2. lens plate; 21. upper extension plate; 211. positioning groove; 22. abutting shaft; 23. second mark; 24. annular vertical edge; 3. lamp board; 4. cover; 41. upper guiding surface; 42. elastic-sheet structure; 421. positioning protrusion; a. inner ring group; b. outer ring group; c. inner waterproof structure; d. outer waterproof structure.

DETAILED DESCRIPTION OF THE EMBODIMENTS

The present disclosure is further described below through specific embodiments.

Figure 2:
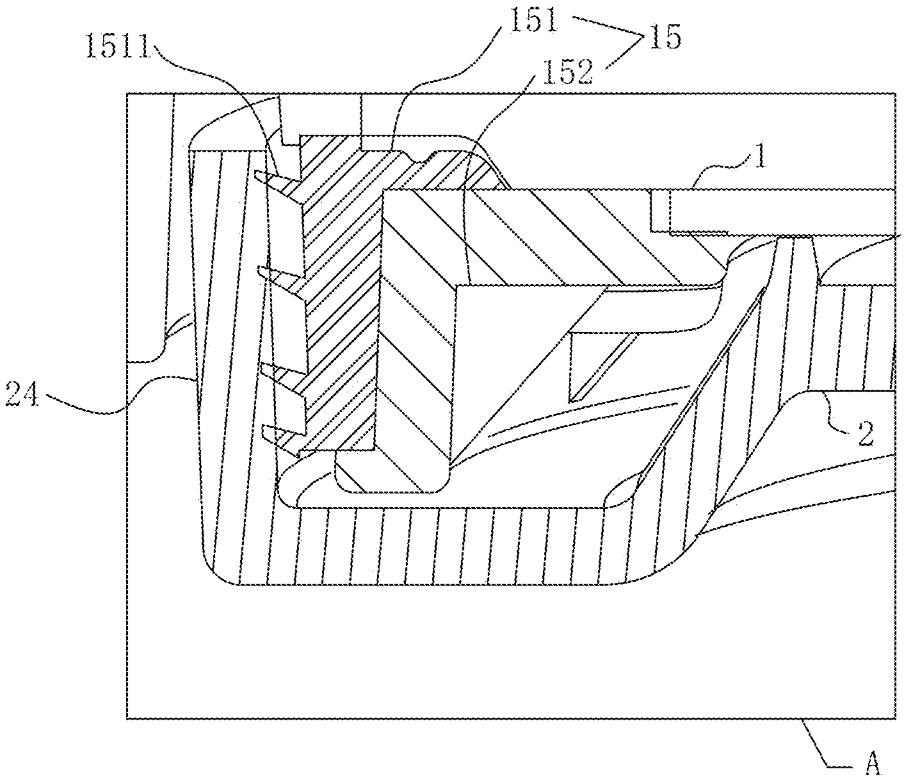
FIG. 2 is an enlarged schematic view of an area A in FIG. 1.
Figure 3:
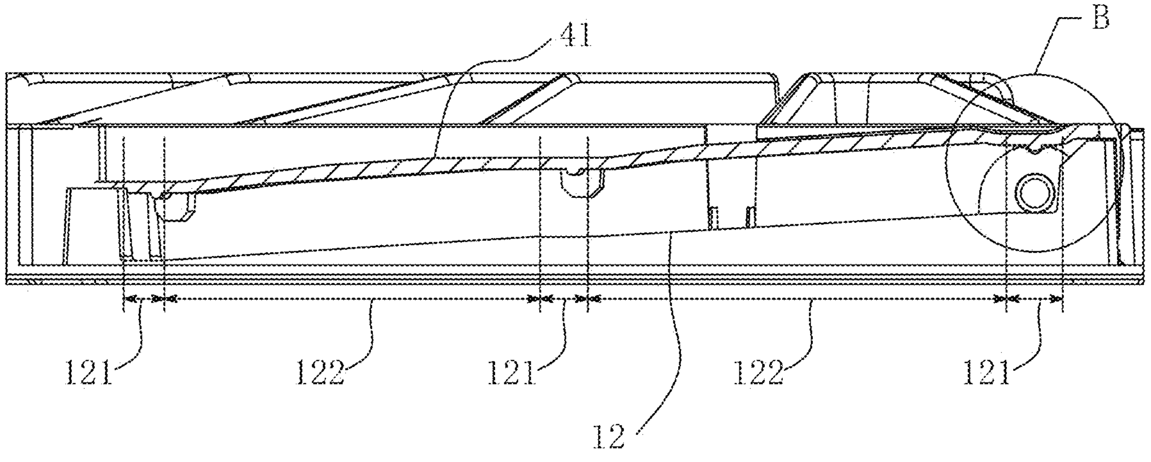
FIG. 3 is a partial cross-sectional schematic view of an outer ring group of the present disclosure.
Figure 4:
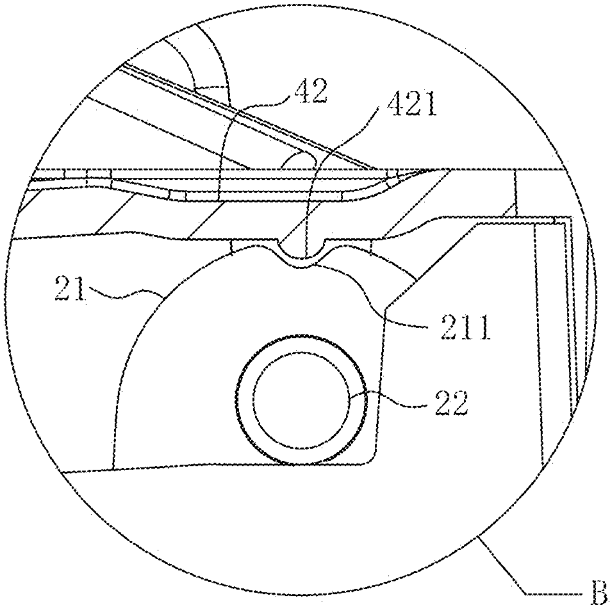
FIG. 4 is an enlarged schematic view of an area B in FIG. 3.
Figure 5:
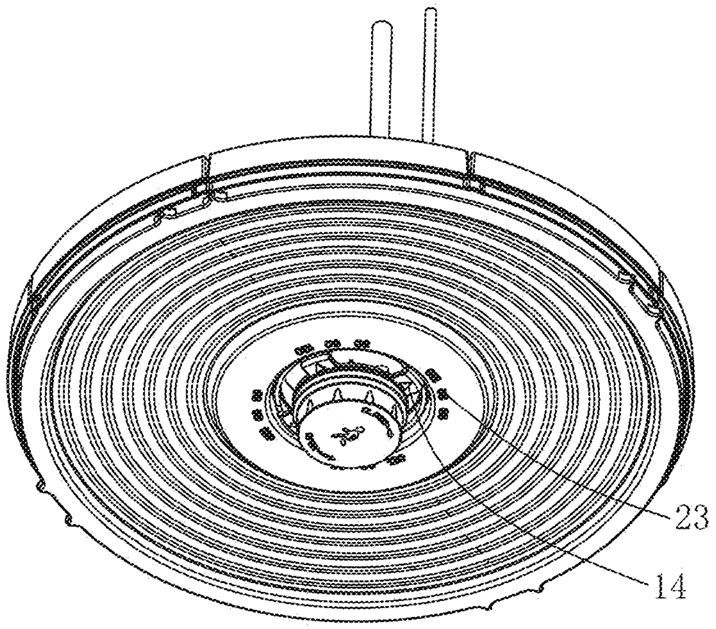
FIG. 5 is a first structural schematic diagram of the lamp with the adjustable light emitting angle of the present disclosure.
Figure 6:
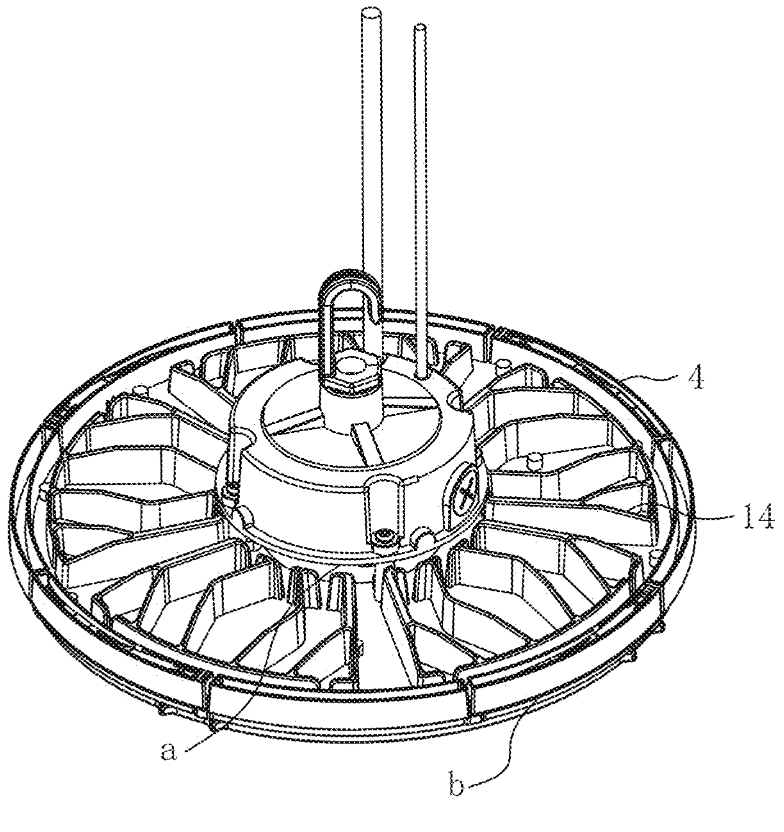
FIG. 6 is a second structural schematic diagram of the lamp with the adjustable light emitting angle of the present disclosure.
Figure 7:
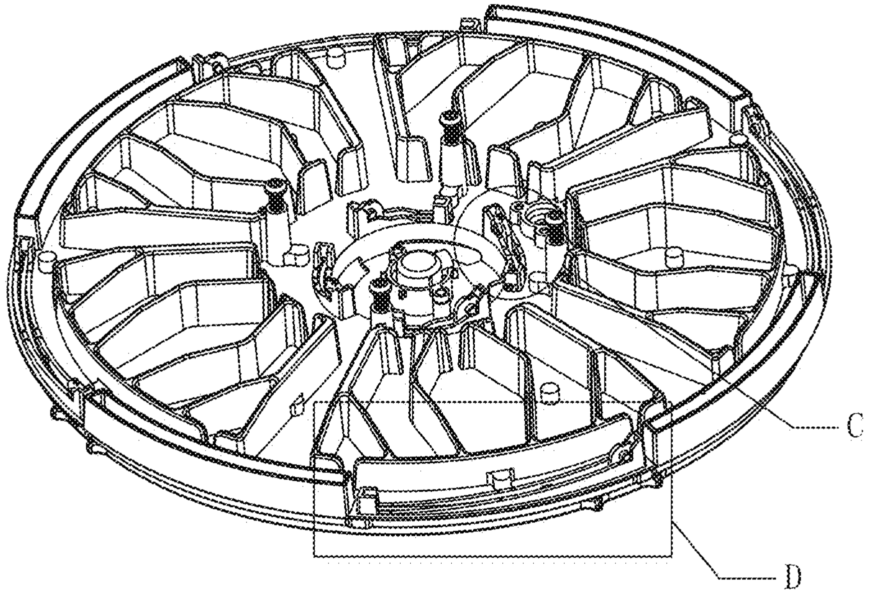
FIG. 7 is a structural schematic diagram of the present disclosure with a cover removed.
Figure 8:
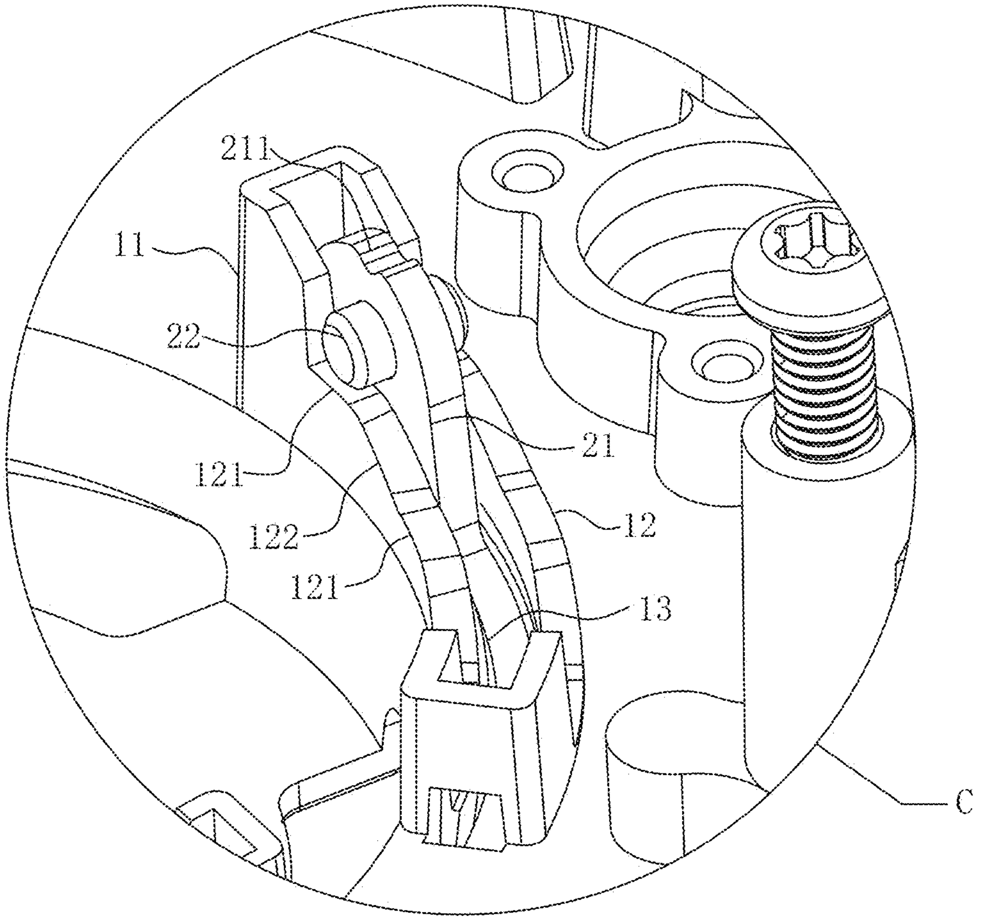
FIG. 8 is an enlarged schematic view of an area C in FIG. 7.
Figure 9:
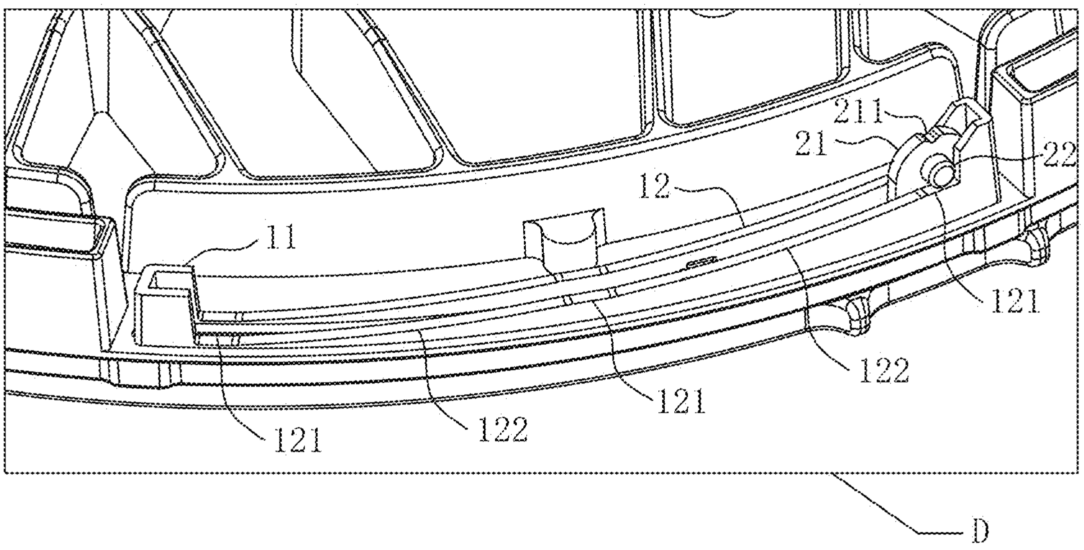
FIG. 9 is an enlarged schematic view of an area D in FIG. 7.
Figure 10:
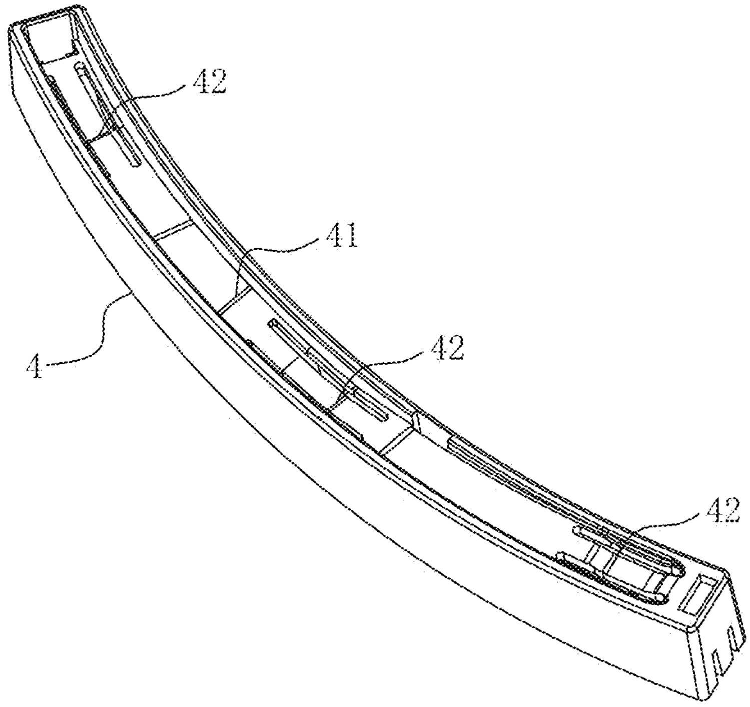
FIG. 10 is a structural schematic diagram of the cover corresponding to the outer ring group of the present disclosure.

Referring to FIGS. 1 to 10, a lamp with an adjustable light emitting angle comprises a supporting plate 1, a lens plate 2, and a lamp board 3.

An upper side of the supporting plate 1 is disposed with one or more guiding members 11. Each of the one or more guiding members 11 has a guiding slope 12 with a varying height. The supporting plate 1 comprises one or more position-providing openings 13 penetrating through the supporting plate 1 along a vertical direction. Each of the one or more position-providing openings 13 corresponds to a position of the guiding slope 12 of a corresponding one of the one or more guiding members 11. The lens plate 2 comprises one or more upper extension plates 21 extending upwardly. Each of the one or more upper extension plates 21 comprises an abutting shaft 22 extending laterally. The lens plate 2 is disposed below the supporting plate 1. The one or more upper extension plates 21 pass through the one or more position-providing openings 13, and the abutting shaft 22 is disposed on the guiding slope 12. A height position of the abutting shaft 22 on the guiding slope 12 is adjusted by changing a relative position of the lens plate 2 and the supporting plate 1, thereby adjusting a distance between the lens plate 2 and the supporting plate 1. The lamp board 3 is installed below the supporting plate 1 and is located between the supporting plate 1 and the lens plate 2. A light emitting angle can be adjusted by changing a distance between the lamp board 3 and the lens plate 2.

The supporting plate 1 has a central axis. The one or more guiding members 11 are a plurality of guiding members 11, and the plurality of guiding members 11 are divided into a plurality of groups of guiding members 11. Each of the plurality of groups of guiding members 11 is arranged in a rotational array around the central axis. Each of the plurality of guiding members 11 has an arc-shaped structure, with the central axis serving as a center of an arc of the arc-shaped structure. The one or more position-providing openings 13 extend in an arc-shaped path along the guiding slope 12 and are formed by removing a middle of the guiding slope 12. The one or more upper extension plates 21 on the lens plate 2 are a plurality of upper extension plates 21, and the plurality of upper extension plates 21 are divided into a plurality of groups of upper extension plates 21. Each of the plurality of groups of upper extension plates 21 is arranged in a rotational array around the central axis. The plurality of upper extension plates 21 correspond to the plurality of guiding members 11 in a one-to-one correspondence. Two sides of each of the plurality of upper extension plates 21 extend laterally to form the abutting shaft 22, and two sides of the abutting shaft 22 are disposed on the guiding slope 12. In a preferred embodiment, the abutting shaft 22 is formed by a pin shaft penetrating through and installed on a corresponding one of the plurality of upper extension plates 21. The lens plate 2 can be rotated around the central axis. The supporting plate 1 and the lens plate 2 have circular structures, and the plurality of guiding members 11 and the plurality of upper extension plates 21 respectively form an inner ring group a and an outer ring group b. The inner ring group a is arranged adjacent to the central axis, and the outer ring group b is arranged at an outer edge of the supporting plate 1. The inner ring group a and the outer ring group b provided in the present application are designed to provide a reliable supporting structure, as well as a reliable rotation and positioning structure between the supporting plate 1 and the lens plate 2.

The supporting plate 1 is disposed with a cover 4, and the cover 4 is installed above the plurality of guiding members 11. The cover 4 has a plurality of upper guiding surfaces 41, and the plurality of upper guiding surfaces 41 are configured to limit a position of tops of the plurality of upper extension plates 21. The plurality of upper guiding surfaces 41 have height-varying shapes that are matched with the guiding slopes 12 of the plurality of guiding members 11, so that a distance from each position of the guiding slope 12 to a corresponding one of the plurality of upper guiding surfaces 41 is consistent. The guiding slope 12 comprises a plurality of lateral flat portions 121 and a plurality of inclined portions 122. Each of the plurality of lateral flat portions 121 is arranged in a height-descending arrangement. Each of the plurality of inclined portions 122 is arranged between two adjacent lateral flat portions 121 of the plurality of lateral flat portions 121. Parts of a corresponding one of the plurality of upper guiding surfaces 41 which are located above the plurality of lateral flat portions 121 form a plurality of elastic-sheet structures 42. Each of the plurality of elastic-sheet structures 42 comprises a positioning protrusion 421 protruding downward. The top of a corresponding one of the plurality of upper extension plates 21 comprises a positioning groove 211 recessed downward. When the corresponding one of the plurality of upper extension plates 21 is in a position corresponding to one of the plurality of lateral flat portions 121, the positioning protrusion 421 is embedded in the positioning groove 211 to form an interlocked connection for the corresponding one of the plurality of upper extension plates 21. When the plurality of elastic-sheet structures 42 are subjected to an external force, the plurality of elastic-sheet structures 42 can be deformed to enable the positioning protrusion 421 to be detached from or be placed in the positioning groove 211. The plurality of elastic-sheet structures 42 and matching parts thereof realizes a damping feeling when the lens plate 2 is rotated to a desired position and can realize precise angle positioning.

The supporting plate 1 comprises a first mark 14, and the lens plate 2 comprises a second mark 23. The first mark 14 and the second mark 23 are adjacent to each other, and a position correspondence state of the first mark 14 and the second mark 23 is configured to indicate a position state of the lens plate 2. Specifically, the first mark 14 is an arrow mark, and the second mark 23 is a plurality of light emitting angle marks. The plurality of light emitting angle marks correspond to the plurality of lateral flat portions 121 in a one-to-one correspondence to indicate the light emitting angle.

An inner side and an outer side of the lens plate 2 each comprises an annular vertical edge 24, and an inner position and an outer position of a bottom of the supporting plate 1 each comprises an annular sealing member 15. The annular sealing members 15 on the supporting plate 1 are respectively adapted to the annular vertical edges 24 on the lens plate 2 to form an inner waterproof structure c and an outer waterproof structure d. The lamp board 3 has a circular ring structure, and the lamp board 3 is located between the inner waterproof structure c and the outer waterproof structure d. The annular sealing member 15 comprises a silicone ring 151 and a fixing ring 152. The fixing ring 152 enables the silicone ring 151 to be secured on the supporting plate 1. The silicone ring 151 has a plurality of protruding rings 1511 extending toward the annular vertical edges 24. The plurality of protruding rings 1511 and the annular vertical edges 24 are mutually pressed, and the plurality of protruding rings 1511 are arranged at intervals in the vertical direction. The plurality of protruding rings 1511 enable the waterproof structures (i.e., the inner waterproof structure c and the outer waterproof structure d) to maintain a reliable waterproof effect during a rotating and lifting process of the lens plate 2. The lamp board 3 of the present application is located between the inner waterproof structure c and the outer waterproof structure d, which ensures that the lamp board 3, which is an electrical component, is not affected by external splashing water and can achieve IP65 level waterproofing.

A working principle of the present application is described as follows.

The lens plate 2 has an optical lens structure. Light emitted by lamp beads on the lamp board 3 is emitted outward after passing through the lens plate 2 to form a specific light emitting angle through a refracting effect of the lens plate 2. Changing the distance between the lens plate 2 and the lamp board 3 will change a light refraction angle and thus change the light emitting angle of the lamp. The lamp board 3 is fixedly installed below the supporting plate 1, and the lens plate 2 is adjustably installed below the supporting plate 1. Therefore, the light emitting angle can be adjusted by adjusting a positional relationship between the lens plate 2 and the supporting plate 1. A specific adjustment method is described as follows. The lens plate 2 is pushed by an external force to be rotated around the central axis, and the abutting shaft 22 is moved along the guiding slope 12. That is, the abutting shaft 22 is moved from one of the plurality of lateral flat portions 121 through one of the plurality of inclined portions 122 to another one of the plurality of lateral flat portions 121. When the abutting shaft 22 reaches a specific one of the plurality of lateral flat portions 121, the plurality of upper extension plates 21 also reach a position at which the positioning protrusion 421 is located. A certain external force is applied to deform a corresponding one of the plurality of elastic-sheet structures 42, so that the positioning protrusion 421 moves up and down and then is embedded into the positioning groove 211. At this time, the plurality of upper extension plates 21 are in a positioned state, and the lens plate 2 is correspondingly maintained at a height position to form a desired light emitting angle. The light emitting angle can be achieved by adjusting a specific lens size and optical parameters, which will not be described in detail here. When the light emitting angle needs to be changed again, the lens plate 2 can be rotated according to the above method. The plurality of lateral flat portions 121 on the plurality of guiding members 11 correspond to a plurality of light emitting angles. That is, the present application has the function of adjusting the plurality of light emitting angles.

The above is only a specific implementation of the present disclosure, but the design concept of the present disclosure is not limited to this. Any non-substantial changes to the present disclosure using this concept shall be deemed as an infringement of the protection scope of the present disclosure.

What is claimed is:

1. A lamp with an adjustable light emitting angle, comprising:
- a supporting plate,
- a lens plate, and
- a lamp board, wherein:
  - an upper side of the supporting plate is disposed with one or more guiding members,
  - each of the one or more guiding members has a guiding slope with a varying height,
  - the supporting plate comprises one or more position-providing openings penetrating through the supporting plate along a vertical direction,
  - each of the one or more position-providing openings corresponds to a position of the guiding slope of a corresponding one of the one or more guiding members,
  - the lens plate comprises one or more upper extension plates extending upwardly,
  - each of the one or more upper extension plates comprises an abutting shaft extending laterally,
  - the lens plate is disposed below the supporting plate,
  - the one or more upper extension plates pass through the one or more position-providing openings,
  - the abutting shaft is disposed on the guiding slope,
  - a height position of the abutting shaft on the guiding slope is configured to be adjusted by changing a relative position of the lens plate and the supporting plate, so that a distance between the lens plate and the supporting plate is configured to be adjusted,
  - the lamp board is installed below the supporting plate and is located between the supporting plate and the lens plate, and
  - a light emitting angle of the lamp is configured to be adjusted by changing a distance between the lamp board and the lens plate.

2. The lamp with the adjustable light emitting angle according to claim 1, wherein:
- the supporting plate has a central axis,
- the one or more guiding members are a plurality of guiding members,
- the plurality of guiding members are divided into a plurality of groups of guiding members,
- each of the plurality of groups of guiding members is arranged in a first rotational array around the central axis,
- each of the plurality of guiding members has an arc-shaped structure, with the central axis serving as a center of an arc of the arc-shaped structure,
- the one or more position-providing openings extend in an arc-shaped path along the guiding slope and are formed by penetrating through a middle of the guiding slope,
- the one or more upper extension plates on the lens plate are a plurality of upper extension plates,
- the plurality of upper extension plates are divided into a plurality of groups of upper extension plates,
- each of the plurality of groups of upper extension plates is arranged in a second rotational array around the central axis,

- the plurality of upper extension plates correspond to the plurality of guiding members in a one-to-one correspondence,
- two sides of each of the plurality of upper extension plates extend laterally to form the abutting shaft,
- two sides of the abutting shaft are respectively disposed on the guiding slope, and
- the lens plate is configured to be rotated around the central axis.

3. The lamp with the adjustable light emitting angle according to claim 2, wherein:
- the supporting plate and the lens plate have circular structures,
- the plurality of guiding members and the plurality of upper extension plates are respectively combined to form an inner ring group and an outer ring group,
- the inner ring group is arranged adjacent to the central axis, and
- the outer ring group is arranged at an outer edge of the supporting plate.

4. The lamp with the adjustable light emitting angle according to claim 2, wherein:
- the abutting shaft is formed by a pin shaft penetrating through and installed on a corresponding one of the plurality of upper extension plates.

5. The lamp with the adjustable light emitting angle according to claim 1, wherein:
- the supporting plate is disposed with a cover,
- the cover is disposed above the one or more guiding members,
- the cover has one or more upper guiding surfaces,
- the one or more upper guiding surfaces are configured to limit a position of a top of the one or more upper extension plates, and
- each of the one or more upper guiding surfaces has a height-varying shape that is matched with the guiding slope of the corresponding one of the one or more guiding members, so that a distance from each position of the guiding slope to a corresponding one of the one or more upper guiding surfaces is equal.

6. The lamp with the adjustable light emitting angle according to claim 5, wherein:
- the guiding slope comprises a plurality of lateral flat portions and a plurality of inclined portions,
- the plurality of lateral flat portions are arranged in a height-descending arrangement, and
- each of the plurality of inclined portions is arranged between two adjacent lateral flat portions of the plurality of lateral flat portions.

7. The lamp with the adjustable light emitting angle according to claim 6, wherein:
- parts of the corresponding one of the one or more upper guiding surfaces which are located above the plurality of lateral flat portions form a plurality of elastic-sheet structures,
- each of the plurality of elastic-sheet structures comprises a positioning protrusion protruding downward,
- the top of the one or more upper extension plates comprises a positioning groove recessed downward,
- when the one or more upper extension plates are in a position corresponding to one of the plurality of lateral flat portions, the positioning protrusion is embedded in the positioning groove to form an interlocked connection for the one or more upper extension plates, and
- when the plurality of elastic-sheet structures are subjected to an external force, the plurality of elastic-sheet structures are configured to be deformed to enable the positioning protrusion to be detached from or be placed in the positioning groove.

8. The lamp with the adjustable light emitting angle according to claim 1, wherein:

the supporting plate comprises a first mark, the lens plate comprises a second mark, the first mark and the second mark are adjacent to each other, and a position correspondence state of the first mark and the second mark is configured to indicate a position state of the lens plate.

9. The lamp with the adjustable light emitting angle according to claim 1, wherein:

an inner side and an outer side of the lens plate each comprises an annular vertical edge, an inner position and an outer position of a bottom of the supporting plate each comprises an annular sealing member, the annular sealing members on the supporting plate are respectively adapted to the annular vertical edges on the lens plate to form an inner waterproof structure and an outer waterproof structure, the lamp board has a circular ring structure, and the lamp board is located between the inner waterproof structure and the outer waterproof structure.

10. The lamp with the adjustable light emitting angle according to claim 9, wherein:

the annular sealing member comprises a silicone ring and a fixing ring, the fixing ring enables the silicone ring to be secured on the supporting plate, the silicone ring has a plurality of protruding rings extending toward the annular vertical edges, the plurality of protruding rings and the annular vertical edges are mutually pressed, and the plurality of protruding rings are arranged at intervals in the vertical direction.

* * * * *